(12) United States Patent
Yatsu et al.

(10) Patent No.: US 7,791,439 B2
(45) Date of Patent: Sep. 7, 2010

(54) ACTUATOR

(75) Inventors: Nobuo Yatsu, Shinagawa (JP);
Shinichiro Akieda, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 232 days.

(21) Appl. No.: 12/068,570

(22) Filed: Feb. 7, 2008

(65) Prior Publication Data
US 2008/0191824 A1 Aug. 14, 2008

(30) Foreign Application Priority Data
Feb. 8, 2007 (JP) ............... 2007-029829

(51) Int. Cl.
*H01H 9/00* (2006.01)
(52) U.S. Cl. ...................... 335/207; 335/256
(58) Field of Classification Search ......... 335/205–207, 335/222, 229–234, 253, 256; 340/407.1, 340/407.2; 360/105, 106; 369/215
See application file for complete search history.

(56) References Cited
U.S. PATENT DOCUMENTS
6,469,500 B1 * 10/2002 Schmitz et al. ........ 324/207.16
6,753,680 B2 * 6/2004 Wolf ..................... 324/207.2
6,982,618 B2 * 1/2006 Akieda et al. ............... 335/222
7,573,361 B2 * 8/2009 Sakurai et al. .............. 335/256

FOREIGN PATENT DOCUMENTS
JP    2003-189579    7/2003

* cited by examiner

*Primary Examiner*—Elvin G Enad
*Assistant Examiner*—Bernard Rojas
(74) *Attorney, Agent, or Firm*—Staas & Halsey LLP

(57) ABSTRACT

An actuator includes: a base member; a first slider that is placed slidably in a first axial direction with respect to the base member; a second slider that is placed slidably in a second axial direction with respect to the base member, the second axial direction being perpendicular to the first axial direction; a moving piece that is placed at a crossing point between the first slider and the second slider, and is capable of moving in a plane, the moving piece being slidably engaged with the first slider and the second slider; a magnet that is fixed to one end of the first slider, and a magnet that is fixed to one end of the second slider; and coils that are designed to allow the magnets to move inner spaces thereof.

8 Claims, 14 Drawing Sheets

ACTUATOR

BACKGROUND OF THE INVENTION

1. Field of the Invention

The present invention generally relates to an actuator of a planar movement type, and more particularly, to an actuator that is incorporated into a mouse used with a personal computer or an operating unit of an audio device or a navigation device, and stimulates the tactile sensation of an operator (a user) so as to transmit certain information to the operator.

2. Description of the Related Art

There has been a type of actuator that has coils each facing a magnet placed on a flat surface, and controls the current to be supplied to the coils, so as to cause a component to move in a plane. Such an actuator can be a novel device for transmitting various kinds of information from a computer to an operator. For example, such an actuator can be incorporated into a mouse that is normally used with a personal computer.

Conventionally, a mouse has been used only as an input device for inputting information from an operator to a computer. However, a mouse containing the above actuator may vibrate in accordance with a signal transmitted from a computer, so as to stimulate the tactile sensation of a finger of the operator, for example. In this manner, the mouse can transmit various kinds of information to the operator. A conventional mouse is a unidirectional interface that works only from an operator to a computer. A mouse containing the above described actuator can serve as a bidirectional machine-man interface between a computer and an operator.

Japanese Unexamined Patent Publication No. 2003-189579 discloses a specific example of an actuator of the above described planar movement type. This actuator includes four magnets that are placed on a flat surface and are in close contact with one another, and four coils that face the respective magnets at predetermined distances and are capable of moving in a plane. When a current is supplied to the coils, a magnetic field is generated in the surrounding area of the coils, and a thrust force is generated to cause the coils to move in a plane by virtue of the electromagnetic force acting on the magnets. A tactile sensation stimulating member (a moving piece) for stimulating a finger of the operator is fixed to the side of the coils.

However, Japanese Unexamined Patent Publication No. 2003-189579 does not disclose a specific example case where the actuator is incorporated into a device such as a mouse, and does not suggest the use of the actuator in an actual product. Furthermore, the disclosed actuator has four coils on the moving end. Cables for supplying current need to be connected to the coils, and a circuit for controlling the current to be supplied to the four coils is also necessary. With those requirements being satisfied, the tactile sensation stimulating member fixed to the coils is moved in a plane (sliding movement) so as to stimulate the tactile sensation of a finger of the operator.

In the actuator disclosed in Japanese Unexamined Patent Publication No. 2003-189579, the coils move in a sliding manner, while dragging the cables. Accordingly, an excessively large thrust force is required. As the cables are dragged, a tension force is also generated on the side of the coils. This results in poor responsiveness. Furthermore, to cause the tactile sensation stimulating member to move in a plane, it is necessary to place a magnet on the entire surface (entire area) on which the coils having the tactile sensation stimulating member fixed thereto are to move. Therefore, it is necessary to prepare a magnet that is large for the area in which the tactile sensation stimulating member is to slide.

As described above, the actuator disclosed in Japanese Unexamined Patent Publication No. 2003-189579 has cables connected to the four coils on the moving end, and a circuit or the like for controlling the current application to the coils. As a result, the actuator tends to become a complicated, large-sized structure. Furthermore, it is necessary to place a magnet on the entire movement area of the coils, which also adds to the size of the actuator. As described above, the actuator disclosed in Japanese Unexamined Patent Publication No. 2003-189579 cannot be readily made smaller and tends to be a large-sized structure, and the components surrounding the actuator are also complicated and costly.

SUMMARY OF THE INVENTION

It is therefore an object of the present invention to provide an actuator in which the above disadvantages are eliminated.

A more specific object of the present invention is to provide an actuator of a planar movement type that has a simpler structure and a smaller size.

According to an aspect of the present invention, there is provided an actuator including: a base member; a first slider that is placed slidably in a first axial direction with respect to the base member; a second slider that is placed slidably in a second axial direction with respect to the base member, the second axial direction being perpendicular to the first axial direction; a moving piece that is placed at a crossing point between the first slider and the second slider, and is capable of moving in a plane, the moving piece being slidably engaged with the first slider and the second slider; a magnet that is fixed to one end of the first slider, and a magnet that is fixed to one end of the second slider; and coils that are designed to allow the magnets to move inner spaces thereof. The actuator thus configured can have an electromagnetic force as a suction or repulsion force acting on each magnet when a current is supplied to the coils, and cause the moving piece to move in a plane based on the combined force of the electromagnetic force acting in the first axial direction and the second axial direction. Having such a simple structure, the actuator can be made smaller.

The actuator may be configured so that position detecting sensors that detect positions of the magnets based on a variation of field intensity is provided for the magnets, each position detecting sensor facing each corresponding one of the magnets. In this case, the position of each magnet can be checked based on the output of the position detecting sensor. Accordingly, a feedback control operation can be performed on the current application to the coils, so as to generate a constant thrust force.

The actuator may be configured so that the magnets are longer than the coils in the respective sliding directions of the first slider and the second slider. Since the largest thrust force can be obtained when the magnetized face (the top end) of a magnet is located in the coil center position, it is preferable that the magnet is designed to have a greater length than the coil.

The actuator may be configured so that each of the coils includes a main coil and auxiliary coils attached to both end portions of the main coil. Since the electromagnetic force (thrust force) acting on a magnet becomes lower at either end portion of the main coil, the auxiliary coils are provided to compensate for the attenuation of the thrust force.

The actuator may be configured so that the auxiliary coils are doubly and coaxially formed outside either end of the main coil. The actuator may be configured so that the auxiliary coils are formed coaxially with the main coil, so as to extend either end portion of the main coil in its axial direction.

The actuator may be configured so that the main coil and the auxiliary coils are driven and controlled independently of one another. In this case, each of the auxiliary coils can be driven only when necessary.

The actuator may be configured so that a current to be supplied to each of the auxiliary coils is controlled in accordance with the position of each corresponding one of the magnets. When the current application to each of the auxiliary coils is controlled in accordance with the position of the magnet, with a predetermined positional function being set in advance, efficient current application can be performed. Thus, a desired thrust force can be maintained, and the power consumption can be reduced.

The actuator may be configured so that the main coil is divided into a center coil and small coils, the small coils being provided at both end portions of the center coil, the small coils having the same length as the auxiliary coils. With this structure, it is possible to switch between a case where a current is applied to the center coil and the two small coils on both sides of the center coil, and a case where a current is applied to the center coil, one of the small coils, and the auxiliary coil located on the same side as the one of the small coils, in accordance with the position of the moving magnet. In this manner, the total length of the coils to which a current is applied is kept the same as the length of the main coil. Thus, an optimum thrust force can be obtained while the power consumption is reduced.

According to the present invention, an actuator of a planar movement type that has a simpler structure and a smaller size can be provided.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of an actuator of a planar movement type in accordance with the present invention, with reference to the accompanying drawings.

Figure 1:
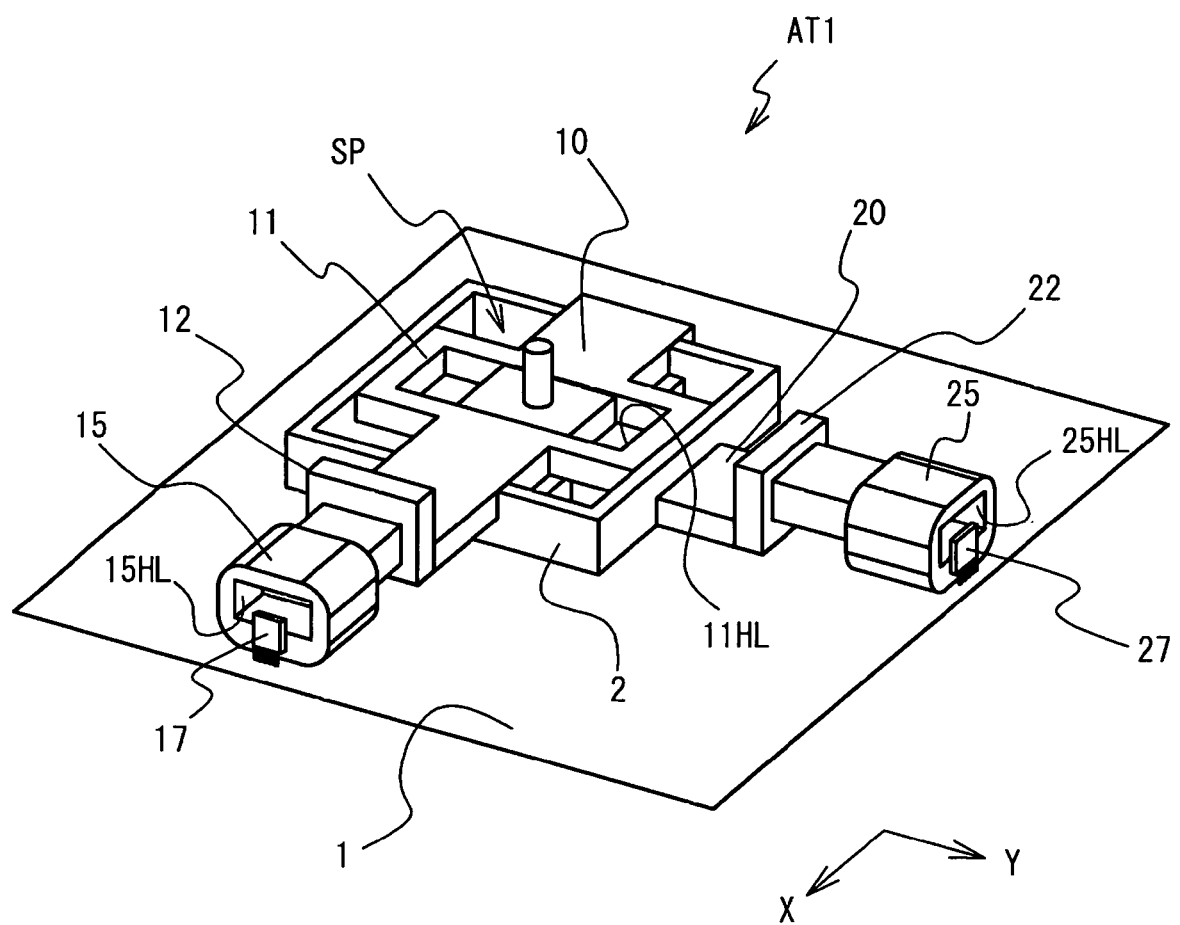
FIG. 1 is an external perspective view of an actuator in accordance with an embodiment of the present invention.
Figure 2:
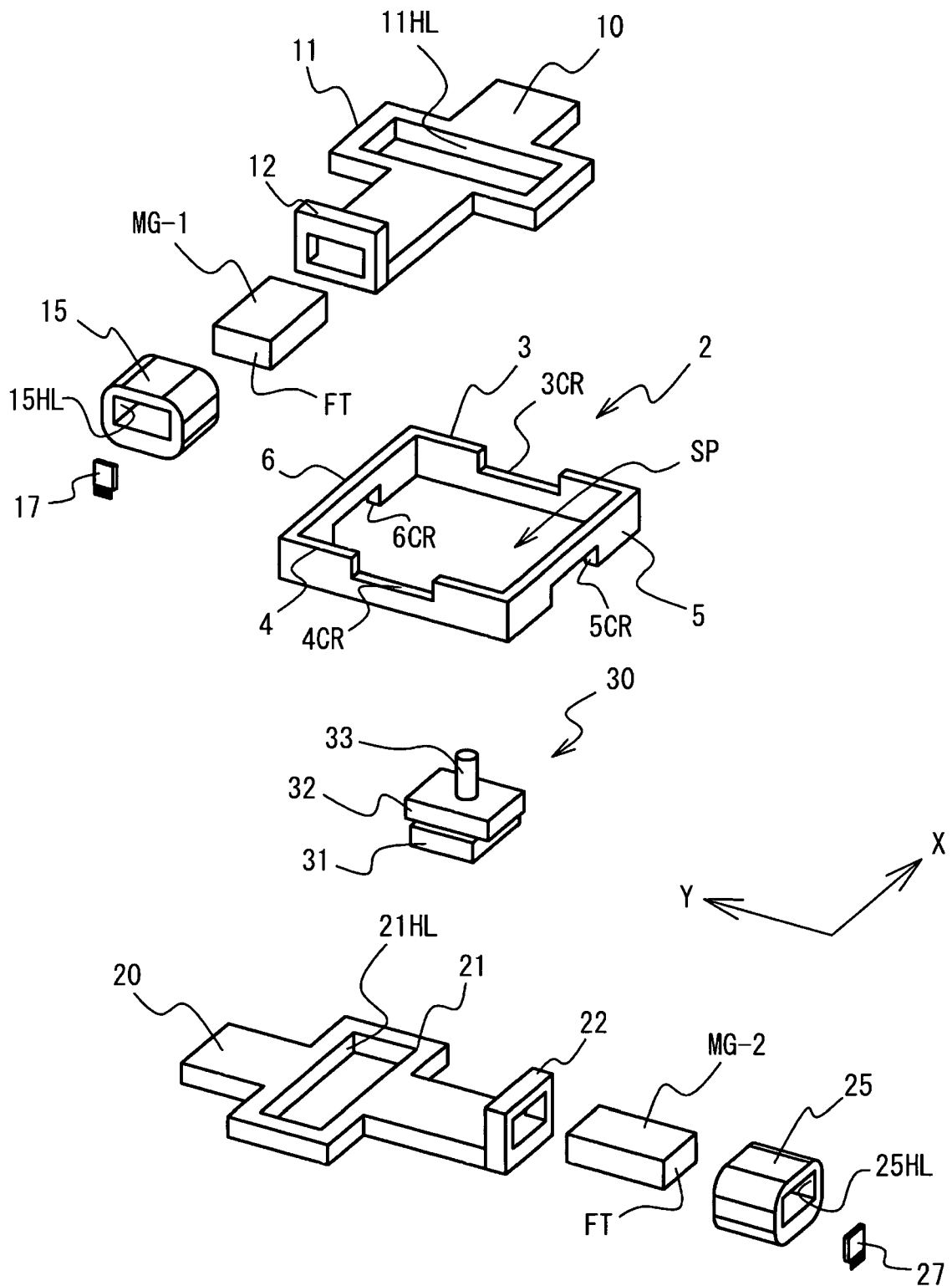
FIG. 2 is an exploded perspective view showing each component of the actuator.

FIGS. 1 and 2 illustrate an actuator AT1 in accordance with an embodiment of the present invention. FIG. 1 is an external perspective view of the actuator AT1. FIG. 2 is an exploded perspective view showing each component of the actuator AT1. The actuator AT1 is designed to be a component to be incorporated into a mouse, for example.

As a mechanical structure, the actuator AT1 includes a substrate 1, a base member 2, a first slider 10 that slides in the X-axis direction, and a second slider 20 that slides in the Y-axis direction, which is perpendicular to the X-axis direction. However, FIG. 2 does not show the substrate 1.

The base member 2 is fixed at a predetermined location on the substrate 1. The first slider 10 is designed to slide in the X-axis direction with respect to the base member 2. The second slider 20 is designed to slide in the Y-axis direction with respect to the base member 2.

The base member 2 is a frame having a rectangular (or square) space SP inside. Components 3 and 4 of the base member 2 that face each other in the X-axis direction have concave portions 3CR and 4CR formed in the respective upper faces. The plate-like first slider 10 is engaged with the concave portions 3CR and 4CR, and is set to slide in the X-axis direction. An extending portion 11 protruding horizontally (in the Y-axis direction) is formed at the middle section of the first slider 10. As can be seen from FIG. 1, the extending portion 11 is housed in the space SP in the base member 2. The extending portion 11 is slidably in contact with the wall faces of the space SP. Accordingly, within a predetermined area, the first slider 10 slides in the X-axis direction with respect to the base member 2. The extending portion 11 has a long hole 11HL with which a moving piece 30 (described later) is slidably engaged.

Further, a magnet fixing portion 12 is formed at one end of the first slider 10, and a first permanent magnet MG-1 is set at this magnet fixing portion 12. Since the first slider 10 is designed to slide in the X-axis direction, as described above, the first slider 10 can slide when an external force (a suction force or a repulsion force) acts in the X-axis direction on the first permanent magnet MG-1. The mechanism for causing the first slider 10 to slide is further described below.

The permanent magnet MG-1 has a rectangular parallelepiped shape, and has its base end supported by the magnet fixing portion 12. In accordance with the area within which the permanent magnet MG-1 moves, a first coil 15 is provided at a predetermined location on the substrate 1. More specifically, the permanent magnet MG-1 has its free end FT movably housed in an internal space 15HL of the first coil 15. When a current is supplied to the coil having the above positional relationship with respect to the magnet, an electromagnetic force acts on the permanent magnet MG-1 according to the Fleming's left-hand rule. A suction force to draw the permanent magnet MG-1 into the coil or a repulsion force to push the permanent magnet MG-1 out of the coil is generated, depending on the direction of the current. Accordingly, the current application to the first coil 15 is controlled so as to generate the electromagnetic force acting on the permanent magnet MG-1 and to generate the thrust force to cause the first slider 10 to slide. The mechanism for generating the electromagnetic force is substantially the same as a known solenoid structure that has a moving core in a coil space and controls the current application so as to move the moving core.

The actuator AT1 further has a mechanism for detecting the relative position of the permanent magnet MG-1 in the X-axis direction. A Hall device 17 is provided as a first position detecting sensor on the opposite side of the first coil 15 from the permanent magnet MG-1. The Hall device is an electromagnetic converting device, and converts the field intensity that varies with the relative distance from the magnet into an electric signal.

Although the components and mechanisms surrounding the first slider 10 have been described above, the second slider 20 to slide in the Y-axis direction involves the same components and mechanisms. A permanent magnet MG-2, a second coil 25, and a Hall device 27 as a second position detecting sensor are provided for the second slider 20. In this structure, the thrust force to cause the second slider 20 to slide is generated, and the location of the permanent magnet MG-2 can be detected by the Hall device 27.

Where the actuator AT1 is assembled as shown in FIG. 1, the extending portion 11 of the first slider 10 and the extending portion 21 of the second slider 20 cross each other at right angles in the space SP in the base member 2, and overlap each other. The crossing section of the extending portion 11 and the extending portion 21 is also the space where the long hole 11HL and the long hole 21HL cross each other. The moving piece 30 is placed in the crossing space. The moving piece 30 has a lower block 31 to be slidably engaged with the long hole 21HL of the second slider 20, and an upper block 32 to be slidably engaged with the long hole 11HL of the first slider 10. The lower block 31 and the upper block 32 are fixed to each other. A moving protrusion 33 is provided on the upper face of the upper block 32. The moving protrusion 33 serves as a tactile sensation stimulating member that stimulates the tactile sensation of a finger of the operator.

The actuator AT1 having the above described structure controls the current to be supplied to the first coil 15, so as to generate an electromagnetic force serving as a suction force or a repulsion force acting on the permanent magnet MG-1 and to cause the first slider 10 in the X-axis direction. Likewise, the actuator AT1 controls the current to be supplied to the second coil 25, so as to generate an electromagnetic force serving as a suction force or a repulsion force acting on the permanent magnet MG-2 and to cause the second slider 20 in the Y-axis direction. Here, the moving piece 30 placed at the crossing point of the first slider 10 and the second slider 20 moves in a synthetic direction of the two sliders moving in the X-Y plane. Accordingly, the moving piece 30 is caused to slide in a desired reaction when necessary, so that the moving protrusion 33 protruding from the upper face of the moving piece 30 can stimulate the touch sensation of a finger of the operator.

The actuator AT1 having the above described structure controls the current to be applied to the coils 15 and 25, so as to cause the moving piece 30 to repeatedly slide in a predetermined direction or to vibrate in a certain position. Accordingly, by incorporating the actuator AT1 into a mouse or the like connected to a computer, various signals can be transmitted from the computer to the operator. Also, the position detecting sensors 17 and 27 that detect the positions of the respective magnets are provided so that the current to be supplied to the coils can be adjusted while the positions of the magnets are being checked. In this manner, feedback control operations can be performed.

The first slider 10 and the second slider 20 of the actuator AT1 are driven by a mechanism similar to a conventional solenoid structure. Therefore, unlike a conventional plane-type actuator, the actuator AT1 does not require a complicated mechanism and large permanent magnets facing each other for causing coils to move at the same time. Accordingly, the actuator AT1 can be presented as an actuator of a planar movement type that has a simple and small-sized structure and can be manufactured at lower costs.

Figure 3A:
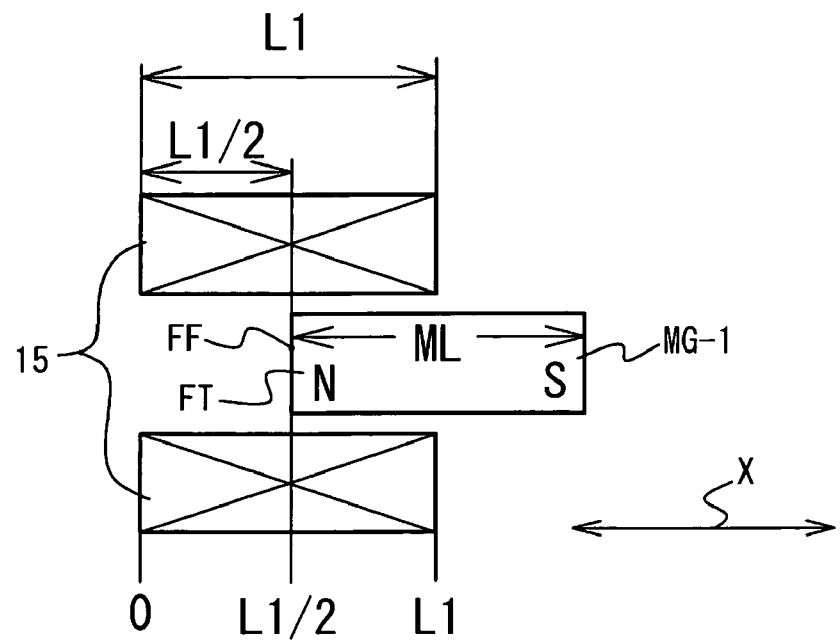
FIG. 3A is an enlarged cross-sectional view showing a magnet housed in a first coil of the actuator.
Figure 3B:
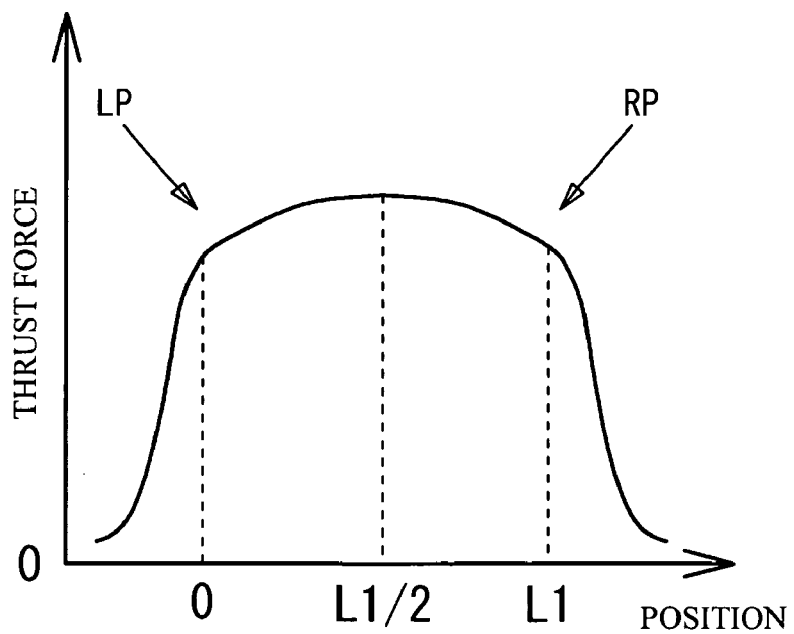
FIG. 3B schematically shows the variation of the thrust force observed at the location of the magnet in the coil.

Preferred example structures and improvement examples of the actuator AT1 are now described. FIGS. 3A and 3B show the relationship between the permanent magnet MG-1 fixed to the first slider 10 and the first coil 15 that generates the suction or repulsion force acting on the permanent magnet MG-1 in the actuator AT1. FIG. 3A is an enlarged cross-sectional view showing the permanent magnet MG-1 housed in the coil 15. FIG. 3B is a graph showing the variation of the thrust force generated at the location of the permanent magnet MG-1 in the coil 15. Although the relationship between the first coil 15 and the permanent magnet MG-1 of the first slider 10 is described here, the same relationship is observed in the second slider 20.

As can be seen from FIG. 3B, the largest thrust force is obtained when the end face (the magnetized face) FF of the free end FT is located at the center position (L1/2) in the coil 15. Therefore, the permanent magnet MG-1 should preferably have such a length that the permanent magnet MG-1 can be smoothly inserted into the coil 15. As shown in FIG. 3A, the length ML of the permanent magnet MG-1 in the X-axis direction should preferably be greater than the total length L1 of the coil 15.

FIG. 3B also shows that the thrust force at either end of the coil 15 attenuates, as indicated by the arrow RP representing the right end and the arrow LP representing the left end. Accordingly, FIG. 3B shows that the thrust force acting on the permanent magnet MG-1 varies, and the thrust force attenuates at either end of the coil 15. To cause the first slider 10 to slide certainly and stably in the X-axis direction, the coil 15 may be designed to have such a size as to allow the attenuation of the thrust force at either end. In such a case, however, the coil 15 becomes large in size, and an excess thrust force is generated when the end face (the magnetized face) FF of the permanent magnet MG-1 is located in the center position. Therefore, the following improvement examples should be preferred.

Improvement Example 1

Figure 4A:
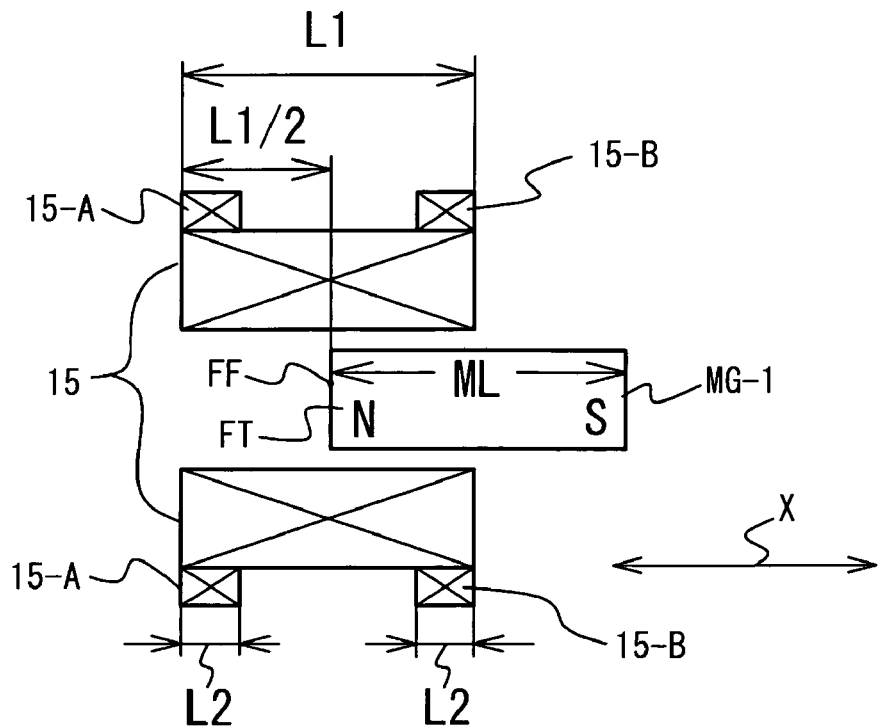
FIGS. 4A and 4B illustrate Improvement Example 1 that is designed to compensate for the attenuation of the thrust force acting on the magnet.
Figure 4B:
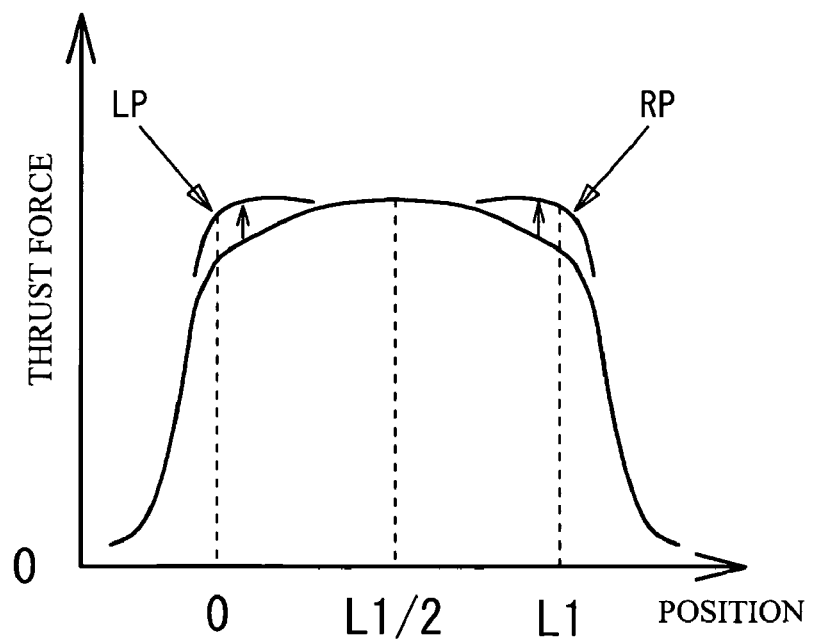

FIGS. 4A and 4B illustrate Improvement Example 1 that is designed to compensate for the attenuation of the thrust force acting on the permanent magnet MG-1. FIG. 4A is an enlarged cross-sectional view of a first improved example structure of the main coil 15 having an auxiliary coil attached to either end. FIG. 4B schematically shows the thrust force observed in the improved structure.

In the structure of Improvement Example 1 illustrated in FIG. 4A, a first auxiliary coil 15-A and a second auxiliary coil 15-B are coaxially added to the outer end portions of the original coil 15. With the improved structure illustrated in FIG. 4A, the first auxiliary coil 15-A and the second auxiliary coil 15-B can compensate for the attenuation of the thrust force at the end portions LP and RP, as shown in FIG. 4B.

The first auxiliary coil 15-A and the second auxiliary coil 15-B can be formed by coaxially winding the coil wire around the main coil (the principal coil) 15. The first auxiliary coil 15-A and the second auxiliary coil 15-B may be formed with a coil wire that is integral with the main coil 15, or may be wires independent of each other. The length of each of the first auxiliary coil 15-A and the second auxiliary coil 15-B in the X-axis direction should preferably be smaller than half the length of the main coil 15 (L1/2), and have the same length as each other (L2).

Improvement Example 2

Figure 5A:
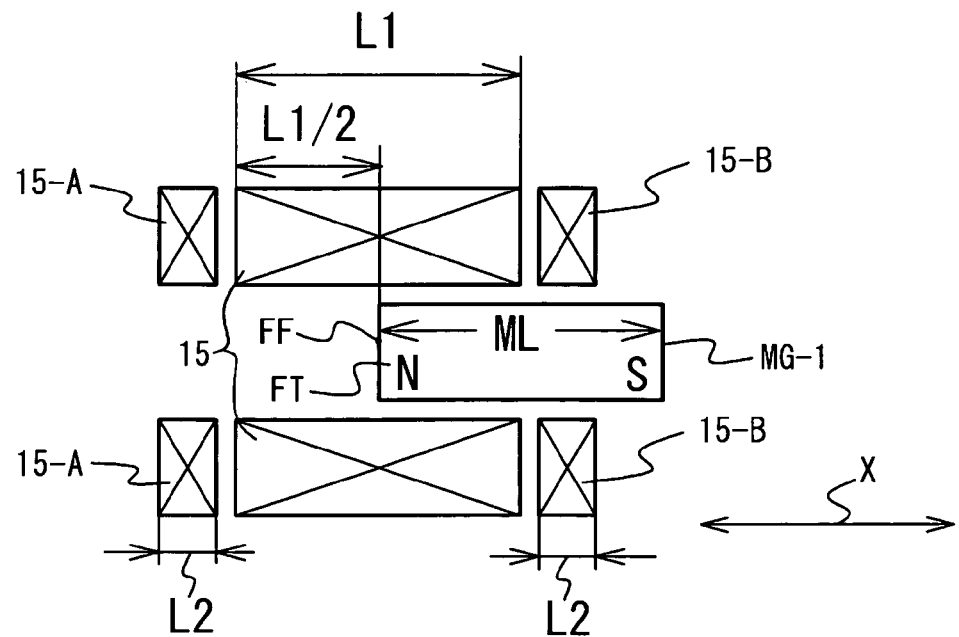
FIGS. 5A and 5B illustrate Improvement Example 2 that is designed to compensate for the attenuation of the thrust force acting on the magnet.
Figure 5B:
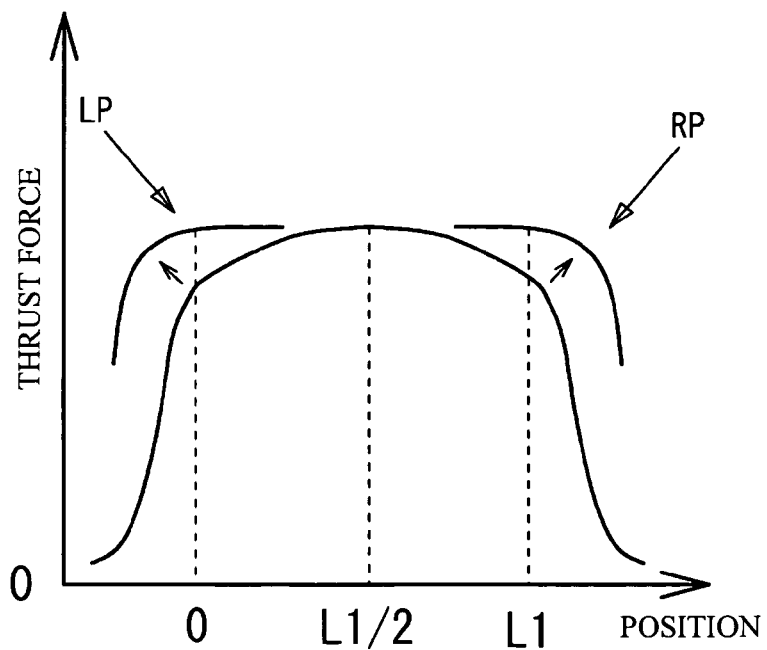

FIGS. 5A and 5B illustrate Improvement Example 2 that is designed to compensate for the attenuation of the thrust force acting on the permanent magnet MG-1. FIG. 5A is an enlarged cross-sectional view of a second improved example structure of the main coil 15 having an auxiliary coil attached to either end. FIG. 5B schematically shows the thrust force observed in the improved structure.

In the structure of Improvement Example 2 illustrated in FIG. 5A, a first auxiliary coil 15-A and a second auxiliary coil 15-B are added so as to extend either end of the main coil 15 in the X-axis direction. With the improved structure illustrated in FIG. 5A, the first auxiliary coil 15-A and the second auxiliary coil 15-B can compensate for the attenuation of the thrust force at the end portions LP and RP, as shown in FIG. 5B.

The first auxiliary coil 15-A and the second auxiliary coil 15-B can be formed by coaxially winding the coil wire around the main coil (the principal coil) 15. The first auxiliary coil 15-A and the second auxiliary coil 15-B are wires independent of the main coil 15.

Figure 6:
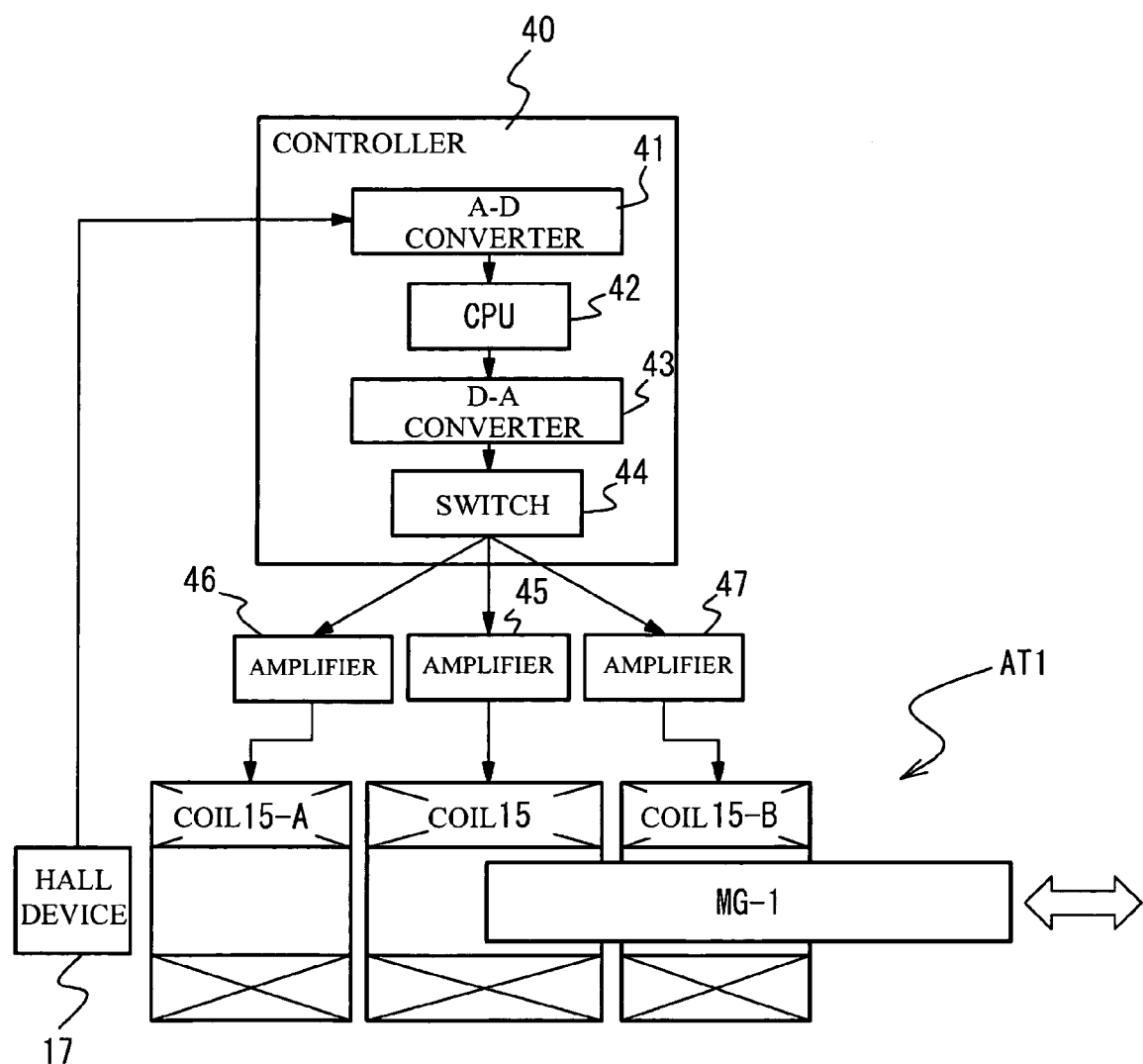
FIG. 6 is a block diagram showing the structure of the actuator having the improved thrust force.

FIG. 6 is a block diagram showing the structure of the actuator AT1 having the improved thrust forces illustrated in FIGS. 4A through 5B. This block diagram also shows a controller 40 that controls the driving of the actuator AT1. The controller 40 checks the location of the permanent magnet MG-1, based on the output from the Hall device 17 serving as a position detecting sensor. The controller 40 then performs a feedback control operation on the current application to the main coil 15 and the auxiliary coils 15-A and 15-B, so as to maintain the thrust force acting on the permanent magnet MG-1. The controller 40 includes a A-D converter 41 that converts signals transmitted from the Hall device 17, a CPU (Central Processing Unit) 42 that controls the entire device, a D-A converter 43, and a switch 44 that switches the coils having a current applied thereto. It is preferable that amplifiers 45, 46, and 47 are provided for the main coil 15 and the auxiliary coils 15-A and 15-B, respectively.

FIG. 6 illustrates an example case where the main coil 15 is independent of each of the auxiliary coils 15-A and 15-B. With this arrangement, the location of the magnet MG-1 can be checked by the Hall device 17, and a current can be applied to the corresponding auxiliary coil only when the magnetized face FF is located at the end portion. Accordingly, the power consumption can be reduced. Alternatively, the current to be applied to the auxiliary coil 15-A and the auxiliary coil 15-B may be controlled as the function according to the position of the moving magnet MG-1, so that the thrust force distribution becomes flat. To perform such a control operation, the attenuation of the thrust force at the end portions is experimentally measured when the magnet MG-1 is moved. Based on the measurement results, the auxiliary energizing program for the auxiliary coil 15-A and the auxiliary coil 15-B in accordance with the position of the magnet MG-1 should be stored in the memory of the CPU 42.

Improvement Example 3

Figure 7A:
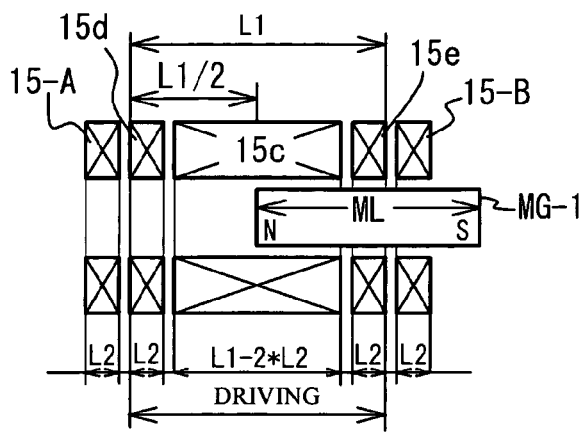
FIG. 7A shows a case where the magnetized face of a magnet of an actuator of Improvement Example 3 is located in the coil center position.
Figure 7A:
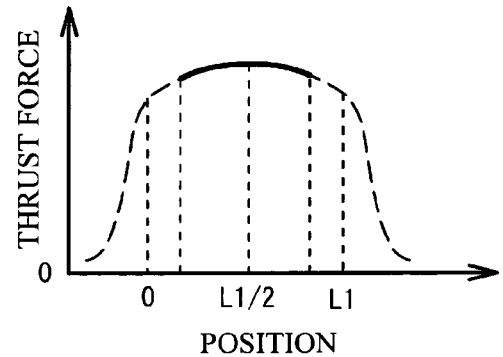
Figure 7B:
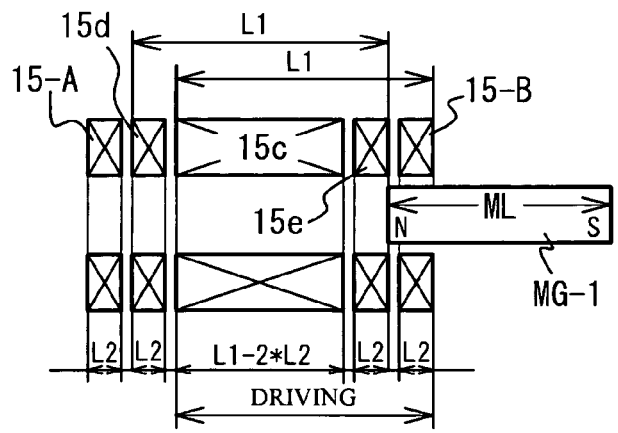
FIG. 7B shows a case where the magnetized face of the magnet of the actuator of Improvement Example 3 is located at a coil end portion.
Figure 7B:
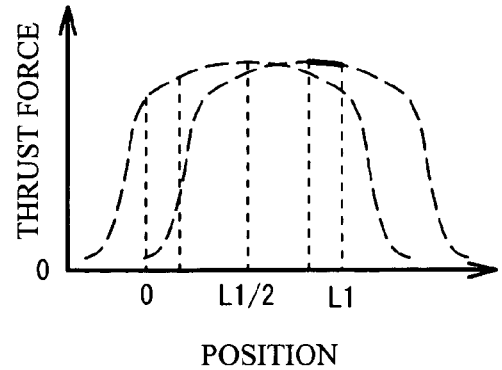

In Improvement Examples 1 and 2, the attenuation of the thrust force is reduced by adding an auxiliary coil at either end of the main coil. In Improvement Example 3, on the other hand, the structure of Improvement Example 2 is further improved to achieve a higher efficiency in power consumption. FIGS. 7A and 7B illustrate operations of the actuator having the structure of Improvement Example 3. FIG. 7A illustrates an example case where the magnetized face FF of the magnet MG-1 is located in the center position of the coil. FIG. 7B illustrates an example case where the magnetized face FF is located at a coil end portion.

In the actuator illustrated in FIGS. 7A and 7B, the main coil 15 having the length L1 is divided to form a novel structure. More specifically, the main coil 15 is divided into three coils: a large coil 15c at the center and small coils 15d and 15e on both sides of the large coil 15c. Those three coils can be energized independently of one another. The above described auxiliary coils 15-A and 15-B are provided on both sides of the main coil 15. Each of the small coils 15d and 15e of the coil 15 has the same length L2 as each of the auxiliary coils 15-A and 15-B.

Figure 8:
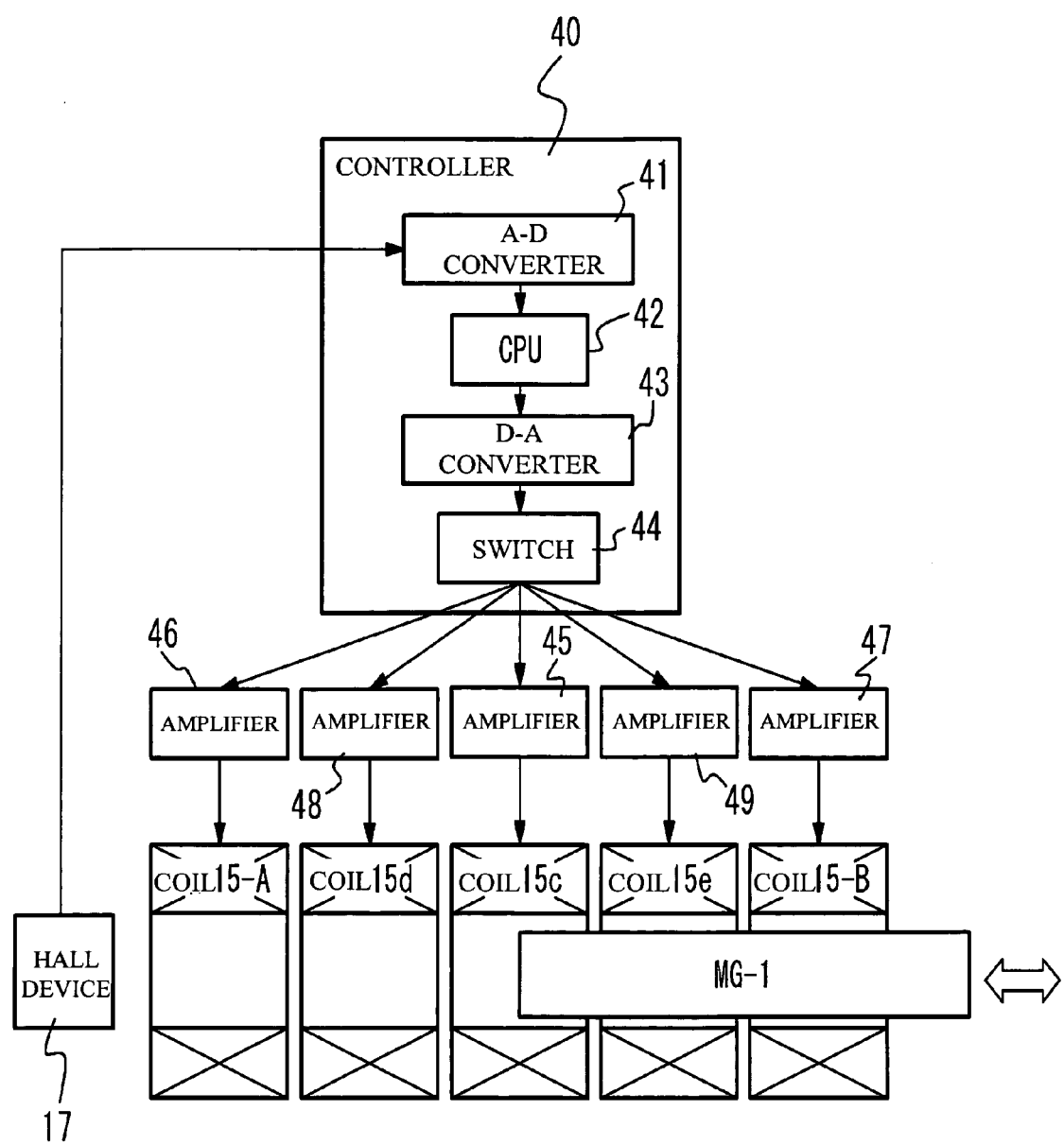
FIG. 8 is a block diagram showing the structure of the actuator of Improvement Example 3.

FIG. 8 is a block diagram showing the structure of the actuator AT1 of Improvement Example 3. FIG. 8 shows the structure in the same format as FIG. 6 illustrating Improvement Examples 1 and 2.

In the actuator of Improvement Example 3, the CPU 42 controls the current application to each coil. In a case where the magnetized face at the top end of the magnet MG-1 is located near the center position, as shown in FIG. 7A, the coil 15c and the coils 15d and 15e are driven integrally with one another. In this case, the main coil 15 is driven as it is, and a current is not applied to the auxiliary coils 15-A and 15-B.

On the other hand, in a case where the magnetized face at the top end of the magnet MG-1 is located near an end portion, as shown in FIG. 7B, the large center coil 15c and the right-side small coil 15e are driven, and, at the same time, the right-side auxiliary coil 15-B is also driven. Here, the main coil 15 originally having the length L1 appears as if shifted by the length L2 of the auxiliary coil 15-B, as shown in the right half of FIG. 7B, and the necessary thrust force can be constantly maintained, without a current being applied to more coils. In the structure of Improvement Example 3, the total length of the coil(s) to be energized is maintained at the same value as the original length L1 of the main coil 15. Accordingly, the structure of Improvement Example 3 serves as an excellent actuator that can certainly maintain the necessary thrust force and reduce the power consumption.

As an embodiment of the present invention, FIGS. 1 and 2 show a structure in which the first slider 10 and the second slider 20 can slide in the X-axis direction and the Y-axis direction, respectively, and the moving piece 30 located at the crossing point of the first slider 10 and the second slider 20 is moved in the X-Y plane. However, the present invention is not limited to the structure shown in FIGS. 1 and 2. Other preferred sliding mechanisms are described below.

First Modification

Figure 9:
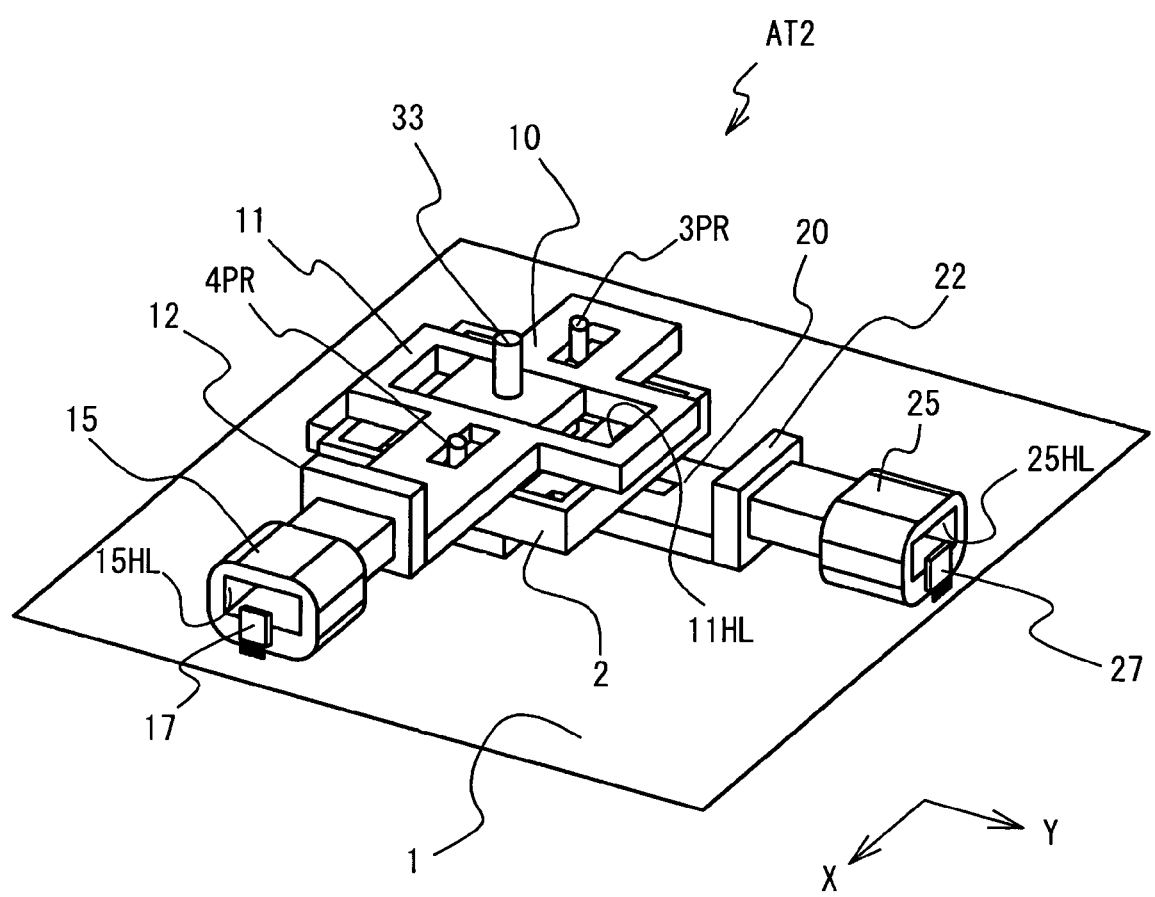
FIG. 9 is an external perspective view of an actuator in accordance with a first modification of the embodiment.
Figure 10:
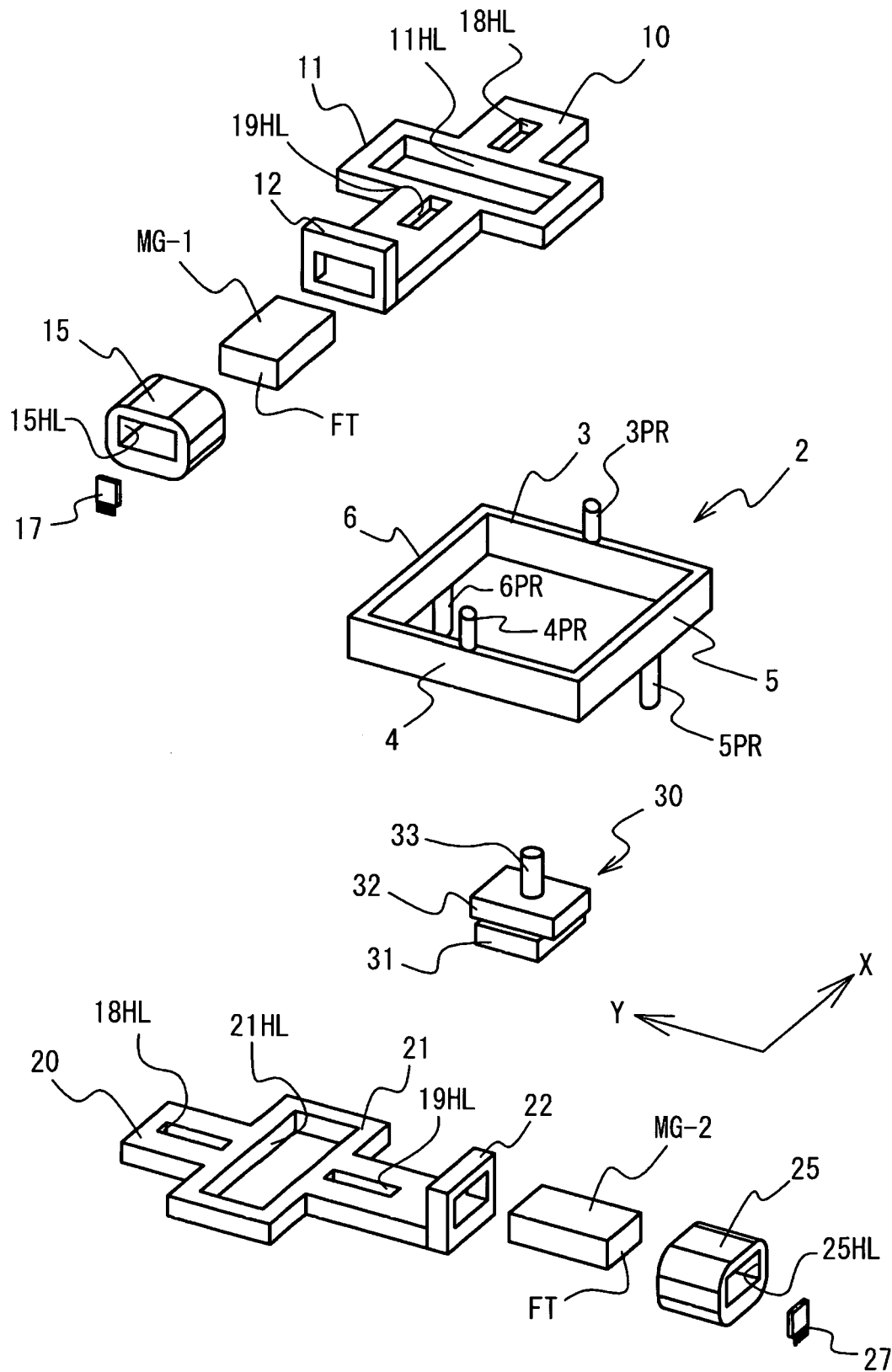
FIG. 10 is an exploded perspective view showing each component of the actuator in accordance with the first modification.

FIGS. 9 and 10 illustrate a first modification of the sliding mechanism of an actuator. FIG. 9 is an external perspective view of an actuator AT2 of the first modification. FIG. 10 is an exploded perspective view of the actuator AT2. In FIGS. 9 and 10, the actuator AT2 is shown in the same manner as in FIGS. 1 and 2. The same components as those of the above described embodiment are denoted by the same reference numerals as those used in the above described embodiment, and explanation of them is omitted here.

In the actuator AT2, the frame-like base member 2 is smaller than that in the above described embodiment. Protrusions 3PR through 6PR protruding upward or downward are added to the respective sides of the base member 2. More specifically, the upward protrusions 3PR and 4PR are provided on components 3 and 4 facing each other. The downward protrusions 5PR and 6PR are provided on the other components 5 and 6.

Long holes 18HL and 19HL with which the protrusions 3PR and 4PR are to be engaged are formed in the first slider 10. With this arrangement, the first slide can slide in the X-axis direction, without the extending portion 11 being engaged with the inner space of the base member 2. The same applies to the second slider 20. Thus, in the first modification illustrated in FIGS. 9 and 10, the base member 2 is smaller than the base member 2 in the above described embodiment.

Second Modification

Figure 11:
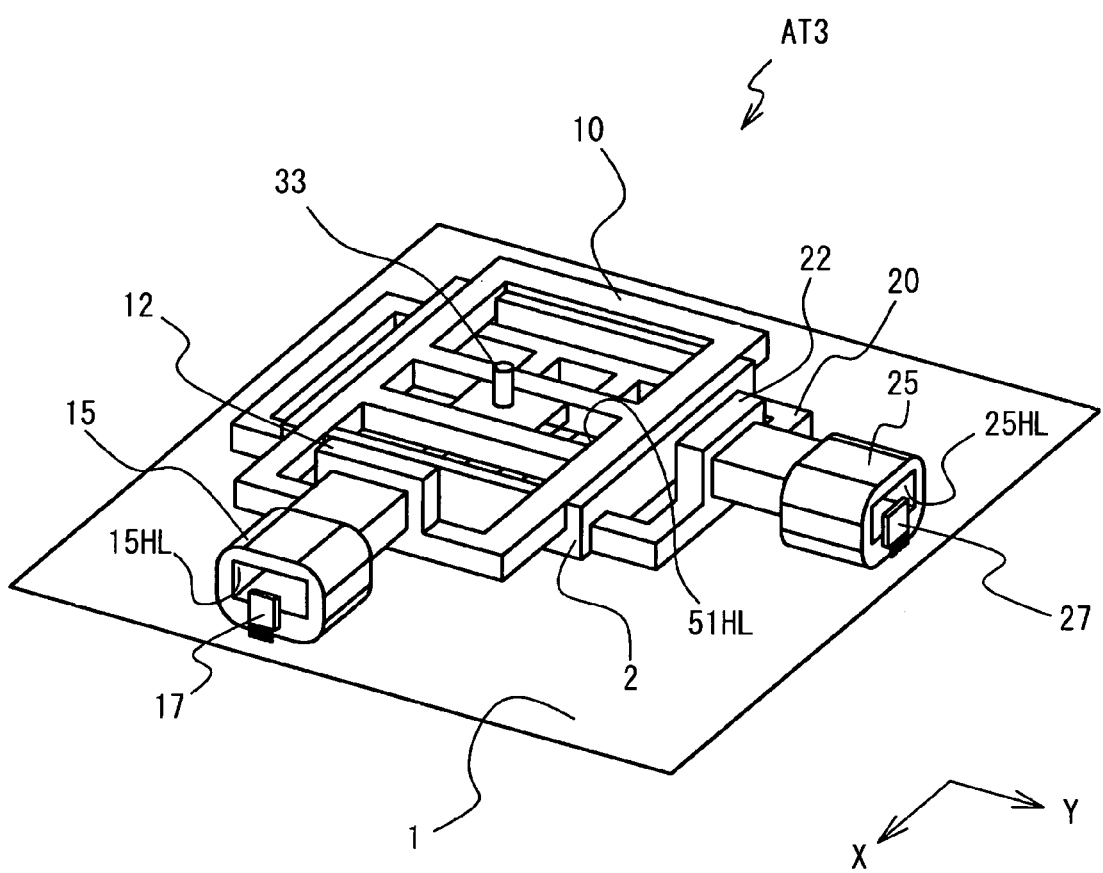
FIG. 11 is an external perspective view of an actuator in accordance with a second modification of the embodiment.
Figure 12:
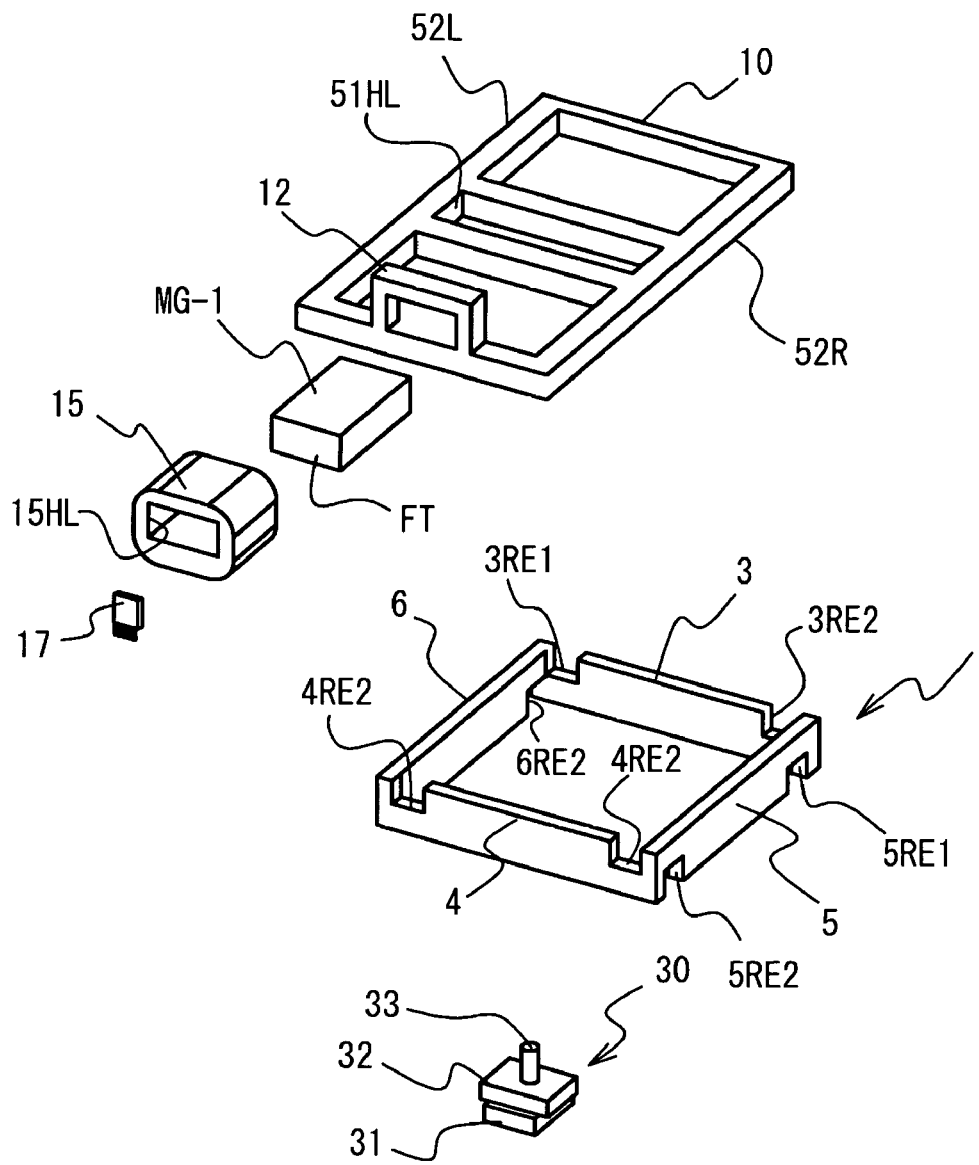
FIG. 12 is an exploded perspective view showing each component of the actuator in accordance with the second modification.
Figure 12:
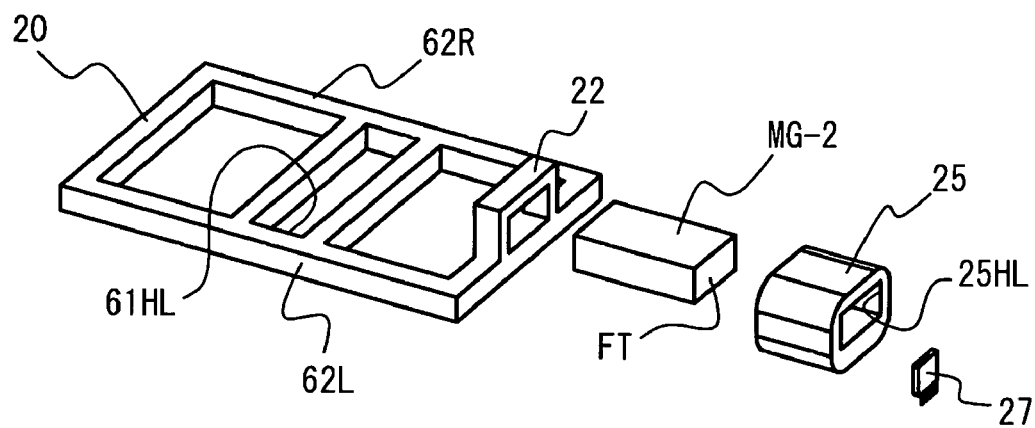

FIGS. 11 and 12 illustrate a second modification of the sliding mechanism of an actuator. FIG. 11 is an external perspective view of an actuator AT3 of the second modification. FIG. 12 is an exploded perspective view of the actuator AT3.

In this actuator AT3, the sliders 10 and 20 have ladder-like shapes. The base member 2 is made smaller than in the base member 2 of the above described embodiment. A groove RE is formed at either end of each side of the base member 2, and the side members 52R and 52L of the slider 10 and the side members 62R and 62L of the slider 20 are to be engaged with the grooves RE. More specifically, upward grooves 3RE1, 4RE1, 3RE2, and 4RE2 are formed in the components 3 and 4 facing each other. Downward grooves 5RE1, 6RE1, 5RE2, and 6RE2 are formed in the other components 5 and 6. In this actuator AT3, the first slider 10 and the second slider 20 are engaged with the grooves formed in the base member 2, and slide along the grooves. Thus, stable sliding operations can be achieved.

Third Modification

Figure 13:
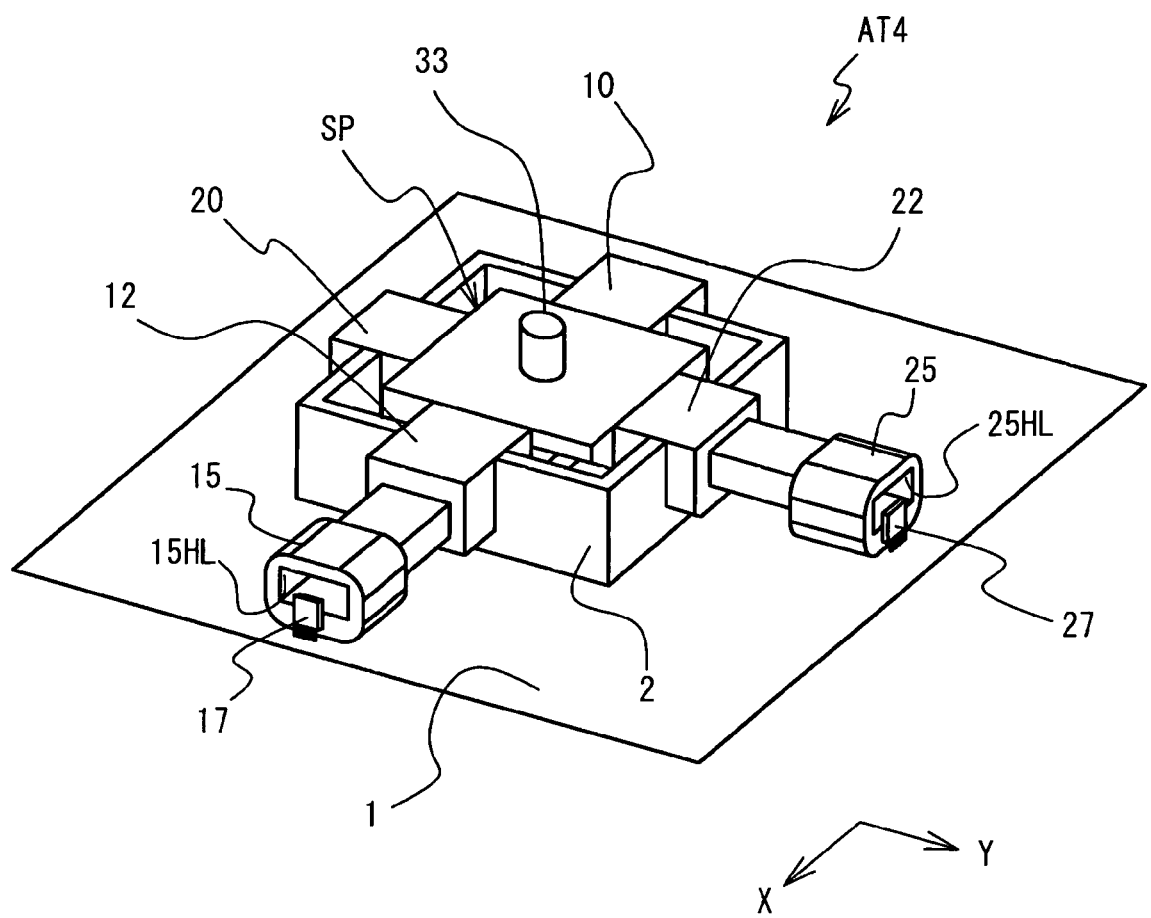
FIG. 13 is an external perspective view of an actuator in accordance with a third modification of the embodiment.
Figure 14:
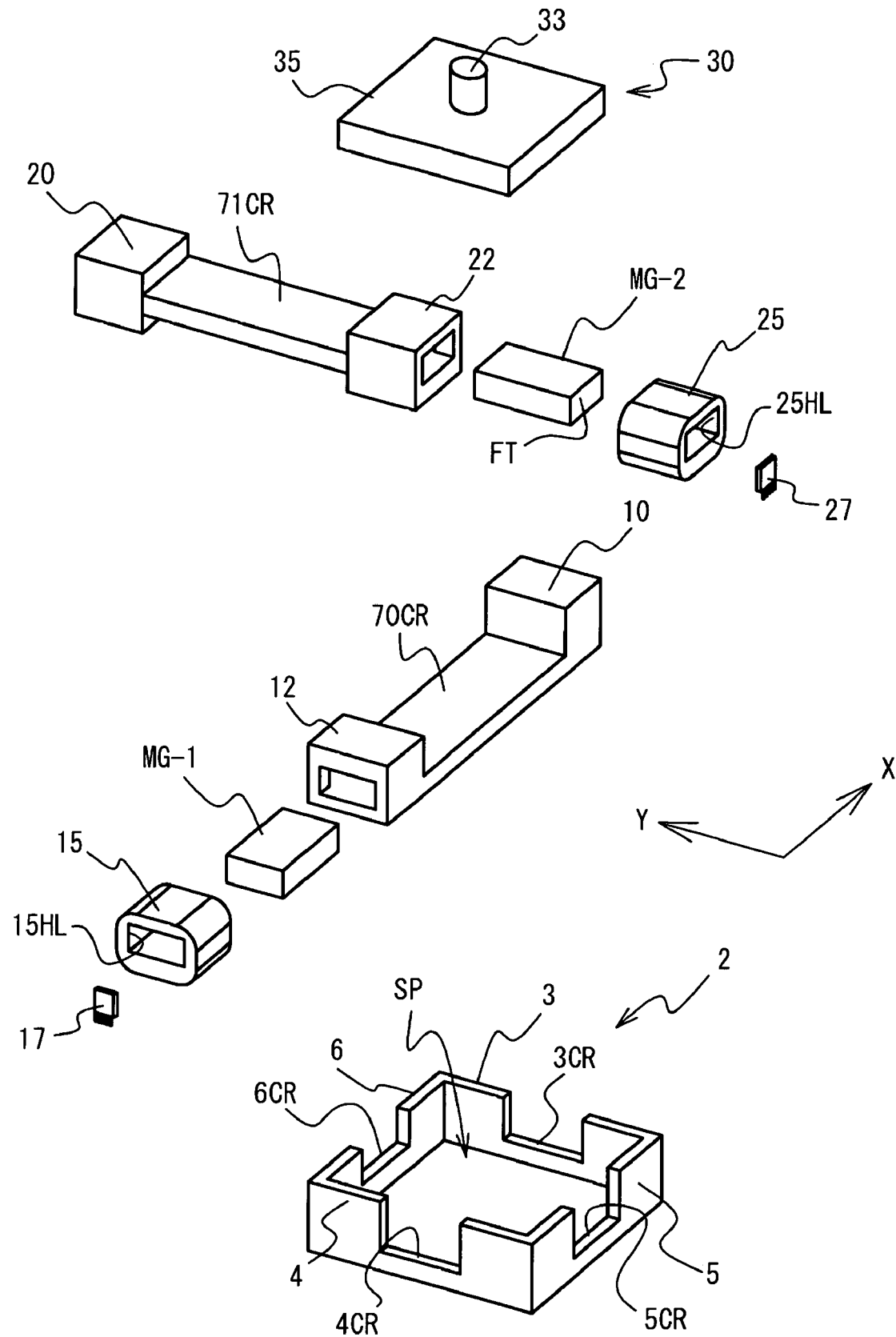
FIG. 14 is an exploded perspective view showing each component of the actuator in accordance with the third modification.

FIGS. 13 and 14 illustrate a third modification of the sliding mechanism of an actuator. FIG. 13 is an external perspective view of an actuator AT4 of the third modification. FIG. 14 is an exploded perspective view of the actuator AT4.

In this actuator AT4, the moving piece 30 is formed with a large rectangular plate member 35 and the above described moving protrusion 33. The plate member 35 is designed to be engaged with the first slider 10 and the second slider 20. The sliders 10 and 20 are stick-like members, and have concave portions 70CR and 71CR at the middle sections. The moving piece 30 is located at the crossing sections of the sliders 10 and 20, and the moving area of the moving piece 30 is restricted by the inner faces of the base member 2. In this actuator AT4, the first slider 10, the second slider 20, the moving piece 30, and the base member 2 have simpler structures than the above described structures. Accordingly, the actuator AT4 can be manufactured with higher efficiency, and the production costs can be reduced.

As described so far, an actuator of a planar movement type in accordance with the present invention requires a smaller number of magnets. Accordingly, the actuator can be made simpler and smaller.

In the above described embodiment, the sliders of the actuator are driven by supplying a current to a coil, or the actuator is passively driven upon receipt of a signal from a computer or the like. However, the use of the actuator is not limited to the above. For example, the actuator may be used as an input device to input instructions to a computer. In such a case, the operator places a finger on the moving piece, and moves the moving piece to vary the output from the position detecting sensor. With the output from the position detecting sensor, the actuator can be used as an instruction input device. Also, based on the positional information, the driving current of the actuator is controlled to perform a feedback operation. In this manner, a stable thrust force can be obtained. At this point, a control operation may be performed to dynamically vary the thrust force. In this manner, more complicated and various operations can be accurately performed.

Although a few preferred embodiments of the present invention have been shown and described, it would be appreciated by those skilled in the art that changes may be made in these embodiments without departing from the principles and spirit of the invention, the scope of which is defined in the claims and their equivalents.

The present application is based on Japanese Patent Application No. 2007-029829 filed Feb. 8, 2007, the entire disclosure of which is hereby incorporated by reference.

What is claimed is:

1. An actuator comprising:
    a base member;
    a first slider that is placed slidably in a first axial direction with respect to the base member;
    a second slider that is placed slidably in a second axial direction with respect to the base member, the second axial direction being perpendicular to the first axial direction;
    a moving piece that is placed at a crossing point between the first slider and the second slider, and is capable of moving in a plane, the moving piece being slidably engaged with the first slider and the second slider;
    a magnet that is fixed to one end of the first slider;
    a magnet that is fixed to one end of the second slider; and
    coils that are designed to allow the magnets to move inner spaces thereof,
    wherein each of the coils includes a main coil and auxiliary coils attached to both end portions of the main coil.

2. The actuator as claimed in claim 1, wherein position detecting sensors that detect positions of the magnets based on a variation of field intensity is provided for the magnets, each position detecting sensor facing each corresponding one of the magnets.

3. The actuator as claimed in claim 1, wherein the magnets are longer than the coils in the respective sliding directions of the first slider and the second slider.

4. The actuator as claimed in claim 1, wherein the auxiliary coils are doubly and coaxially formed outside either end of the main coil.

5. The actuator as claimed in claim 1, wherein the auxiliary coils are formed coaxially with the main coil, so as to extend either end portion of the main coil in its axial direction.

6. The actuator as claimed in claim 1, wherein the main coil and the auxiliary coils are driven and controlled independently of one another.

7. The actuator as claimed in claim 1, wherein a current to be supplied to each of the auxiliary coils is controlled in accordance with the position of each corresponding one of the magnets.

8. The actuator as claimed in claim 1, wherein the main coil is divided into a center coil and small coils, the small coils being provided at both end portions of the center coil, the small coils having the same length as the auxiliary coils.

* * * * *